UNITED STATES PATENT OFFICE.

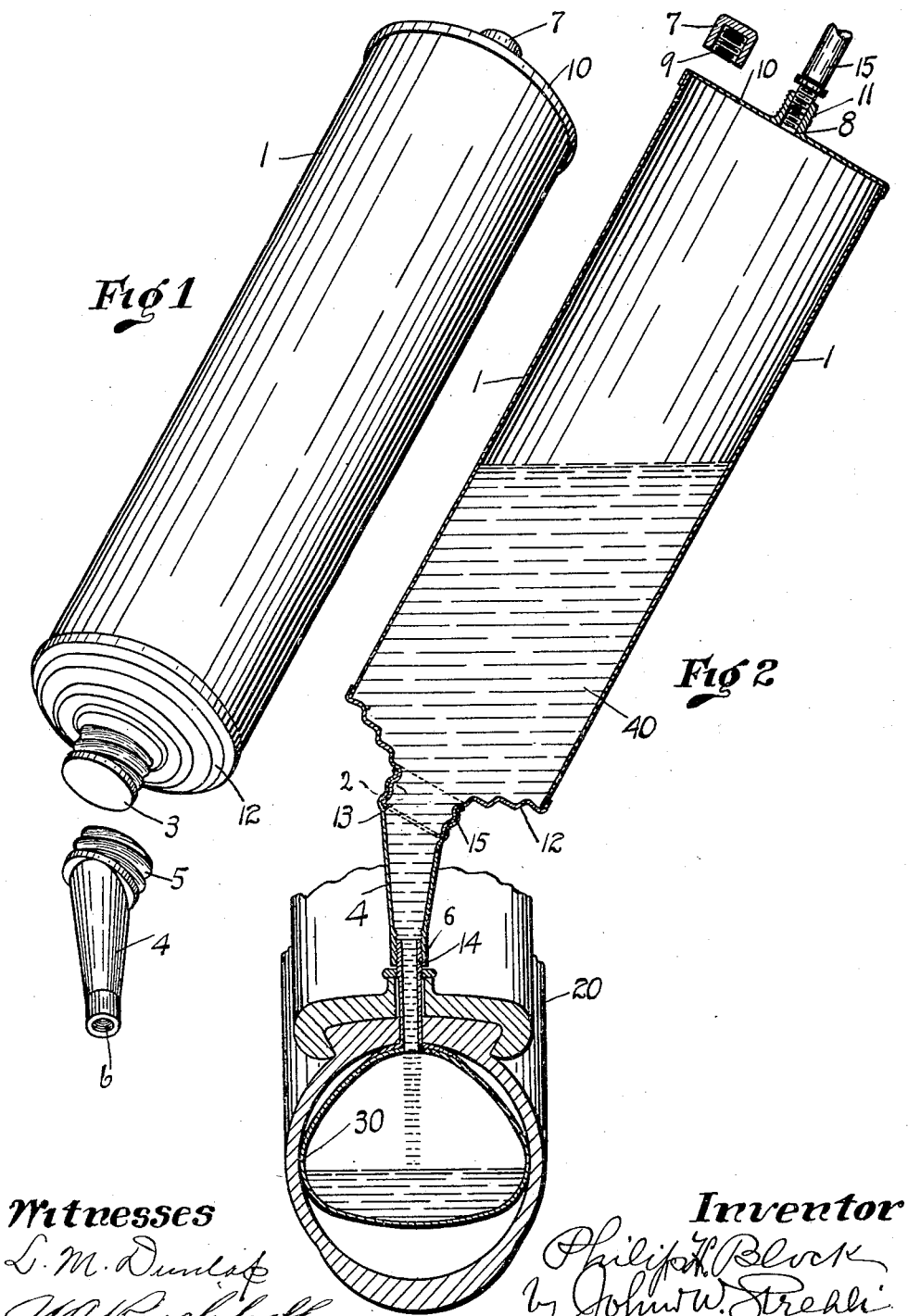

PHILIP H. BLOCK, OF CINCINNATI, OHIO.

RECEPTACLE FOR PUNCTURE-CLOSING COMPOUNDS.

1,290,884.
Specification of Letters Patent.
Patented Jan. 14, 1919.

Application filed March 22, 1916. Serial No. 85,790.

*To all whom it may concern:*

Be it known that I, PHILIP H. BLOCK, a citizen of the United States, residing at the city of Cincinnati, in the county of Hamilton and State of Ohio, have invented certain new and useful Improvements in Receptacles for Puncture-Closing Compounds, of which the following is a specification.

My invention belongs to that class of receptacles for puncture closing compounds which can be shipped and used as an original package, ready for use by the operator at any time it is desired to use the same.

It is more simple, convenient, and more efficient in use than the receptacles used for this purpose now, and now on the market.

It consists essentially of a cylindrical body portion, having screw capped means at each end, and a separate nozzle which can be screwed to, and unscrewed from the forward end of the body portion; the end screw cap also capable of being unscrewed so that an air or force pump can be attached thereto for forcing the puncture closing compound into the pneumatic tire.

Its essential features and advantages will readily become apparent from reading the following specification.

In the accompanying drawing forming part of this specification,

Figure 1, is an isometric view of the device, and

Fig. 2, is a similar view partly in section and a sectional view of a pneumatic tire.

In the drawing 1 represents a cylindrical body portion for containing the puncture closing compound, it being closed at the ends by caps 10 and 12 rigidly secured to the cylindrical body 1 and making an air tight container.

At the mouth and forward part of the container, I place on cap 12, a screw-threaded spout 13 having screw threads 2 and onto these screw threads I screw the screw threaded cap 3.

At the back or rear part of the container, on cap 10, I place a screw-threaded tube 8 having screw threads 11 upon which the screw threads 9 of cap 7 fit when said cap is screwed on or off.

I provide a nozzle 4 having an internally screw threaded nose 6 and an externally screw threaded end 5, this nozzle preferably being of a tapered form as shown.

The tire is marked 20, the inner tube 30 and the compound is marked 40, and the tubular stem used in connection with the valve of the pneumatic tire is marked 14.

One of the great advantages of my device is that the nozzle is disconnected from the container, as it is more convenient and satisfactory, and better results are attained by placing the nozzle separately in the valve stem 14. The original package containing the compound is in better form by having a screw cap at each end, as it can be more depended upon in shippage and usage, the compound can be better placed into the pneumatic tire, more evenly distributed, and more effectually carry out the results to be attained by its use.

In using my device the first thing to do is to jack up the wheel, and take the cap off of the air valve and take out the plunger, allowing all the air to escape from the tire and to see that the valve stem 14 is free and clear; then screw the nozzle 4, with open end facing outward, onto said stem 14, then turn the wheel so that the spout hangs down or depends from above or from the upper side of the wheel; then remove the cap 3 and then screw the container to the nozzle 4, the threads 5 fitting the screw threads 2; then give the wheel a half turn so that the nozzle and container project upward, now unscrew the nipple or cap 7 from the tube 8 of the can; then fasten the air pump 15 and apply the air slowly and steadily into the contents of the can and inside the tube of the tire. When this work has been done the container and nozzle should be unscrewed, the plunger replaced into the valve stem and the tire pumped to the desired pressure. The rolling and turning of the wheel and the heat incident to its travel, distribute the compound evenly over the interior of the tire tube.

I force the compound from the container into the tube of the tire by means of an air pump or air pressure and I show the pump 15 in position on the nipple or tubular stem 8, the pump being partly broken away and not shown. The application of the compound through the medium of an air pump is positive, satisfactory and highly convenient, at the same time more effective and steady and it also brings into use the air pump which all owners of vehicles using tires of this class carry with them.

The specific construction of the device as herein set forth may be modified to some degree and the contour of the parts changed, without departing from the spirit of the invention, and I desire to be understood as claiming that such modification shall still fall within the scope of my invention.

What I claim as new and of my invention and desire to secure by Letters Patent is:

In a receptacle for holding puncture closing compounds, a body portion, a screw threaded nipple at each end of the body portion, screw threaded caps for engaging said nipples, a nozzle with screw threads at both ends, one for engagement with the nipple on the forward end of the body portion and the other for engagement with the valve stem of a pneumatic tire, said nozzle capable of being engaged and disengaged with the body portion and the tire valve tube, the nipple at the upper end of the body portion capable of receiving the end of an air pump, enabling the compound to be forced through the body portion into the tire by air pressure, all combined and operating as set forth.

Witness my hand at Cincinnati, Ohio, March 14th, 1916.

PHILIP H. BLOCK

Witnesses:
 W. A. RICKHOFF,
 G. L. BLOCK.

Copies of this patent may be obtained for five cents each, by addressing the "Commissioner of Patents, Washington, D. C."